(12) United States Patent
Misra et al.

(10) Patent No.: US 11,805,087 B2
(45) Date of Patent: Oct. 31, 2023

(54) DEVICE AND METHOD TO DYNAMICALLY CONTROL UNAUTHORIZED TRANSMISSION OF MESSAGING IN A MESSAGING PLATFORM

(71) Applicants: Hemant Misra, Bangalore (IN); Bhavna Misra, Bangalore (IN)

(72) Inventors: Hemant Misra, Bangalore (IN); Bhavna Misra, Bangalore (IN)

(*) Notice: Subject to any disclaimer, the term of this patent is extended or adjusted under 35 U.S.C. 154(b) by 0 days.

(21) Appl. No.: 17/785,850

(22) PCT Filed: Dec. 12, 2020

(86) PCT No.: PCT/IB2020/061862
§ 371 (c)(1),
(2) Date: Jun. 15, 2022

(87) PCT Pub. No.: WO2021/124061
PCT Pub. Date: Jun. 24, 2021

(65) Prior Publication Data
US 2023/0008353 A1 Jan. 12, 2023

(30) Foreign Application Priority Data
Dec. 15, 2019 (IN) .............................. 201941051980

(51) Int. Cl.
*H04L 51/212* (2022.01)
*H04L 51/216* (2022.01)
*H04L 51/48* (2022.01)

(52) U.S. Cl.
CPC .......... *H04L 51/212* (2022.05); *H04L 51/216* (2022.05); *H04L 51/48* (2022.05)

(58) Field of Classification Search
CPC ..... H04L 51/212; H04L 51/216; H04L 51/48; H04L 51/10
See application file for complete search history.

(56) References Cited

U.S. PATENT DOCUMENTS

| | | | |
|---|---|---|---|
| 10,313,286 B2* | 6/2019 | Ördögh | H04L 51/216 |
| 2006/0075040 A1 | 4/2006 | Chmaytelli | |
| 2009/0132664 A1* | 5/2009 | Radenkovic | G06Q 10/107 709/206 |
| 2015/0326519 A1* | 11/2015 | Bhide | G06F 16/245 709/206 |
| 2018/0219822 A1* | 8/2018 | Bikumala | H04L 51/214 |
| 2021/0105237 A1* | 4/2021 | Wisgo | H04L 51/214 |

* cited by examiner

*Primary Examiner* — Austin J Moreau
(74) *Attorney, Agent, or Firm* — Maschoff Brennan (57) ABSTRACT

Disclosed is a method for controlling the unauthorized transmission of a messaging thread in a messaging platform. The method includes the step of receiving first user addresses of intended recipients through an address module. The method then includes the step of initiating a messaging thread by entering textual information and/or attaching a media file through a messaging module or both. Further, the method includes the step of pre-storing second user addresses intended to be removed from the messaging thread through a listing module. The method then includes the step of matching the first user addresses of intended recipients with the second user addresses stored in the listing module through a matching module. The method includes the step of preventing transmission of the messaging thread to the matched second user addresses pre-stored in the listing module through a filter module.

10 Claims, 5 Drawing Sheets

DEVICE AND METHOD TO DYNAMICALLY CONTROL UNAUTHORIZED TRANSMISSION OF MESSAGING IN A MESSAGING PLATFORM

TECHNICAL FIELD

The present invention relates to data security, in particular to methods and devices for controlling an unauthorized transmission of a messaging thread in a messaging platform.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

With the advent of messaging platforms in an ever-evolving world of person to person communication, the importance of efficient and secure transmission of a messaging thread have been increased. This specification recognizes that messaging platforms are required to communicate confidential questions, information and discussions to a large group of people in an organization, and it is a challenge to process and secure the transmission of the messaging thread. Additionally, it is recognized in this specification that providing data security is a challenge due to the evolving ways used to breach the confidentiality of the messaging thread.

OBJECT OF THE INVENTION

It is an object of the present invention to deploy an enhanced data security mechanism on to various messaging platforms to control the unauthorized transmission of a messaging thread in the messaging platforms.

Another object of the present invention is to ensure integrity, confidentiality, and authenticity of the data (messaging thread).

Yet another object of the present invention is to allow users to suppress or otherwise control one or more recipients of a messaging thread.

SUMMARY OF THE INVENTION

The present invention mainly cures and solves the technical problems existing in the prior art. In response to these problems, the present invention provides a device and method for controlling the unauthorized transmission of a messaging thread in a messaging platform.

An aspect of the present disclosure relates to a method for controlling the unauthorized transmission of a messaging thread in a messaging platform. The method includes the step of receiving a plurality of first user addresses of a plurality of intended recipients through one or more address modules. The method then includes the step of initiating a messaging thread by performing at least one of entering textual information, attaching a media file through a messaging module, and/or a combination thereof. Further, the method includes the step of pre-storing one or more second user addresses intended to be removed from the messaging thread through a listing module. The method then includes the step of matching the plurality of first user addresses of intended recipients with the second user addresses stored in the listing module through a matching module. The method includes the step of preventing transmission of the messaging thread to the matched second user addresses pre-stored in the listing module through a filter module.

In an aspect, the method includes the step of preventing the messaging thread from being transmitted to the one or more second user addresses by the plurality of intended recipients through a prevention module.

In an aspect, the method includes the step of analyzing the textual information, one or more first and/or second user addresses, and the attached media file to quantify a confidentiality level based on the analysis through a content and/or address analysis module.

In an aspect, the method includes the step of suggesting the one or more second user addresses to be stored in the listing module based on the quantified confidentiality level through a suggestion module.

In an aspect, the one or more first user addresses are different from the one or more second user addresses.

An aspect of the present disclosure relates to an unauthorized transmission control device to dynamically control the unauthorized transmission of a messaging thread in a messaging platform that includes a processor, and a memory communicatively coupled to the processor. The memory stores instructions, which, on execution by the processor, causes the processor to receive a plurality of first user addresses of a plurality of intended recipients through one or more address modules. The processor is configured to initiate a messaging thread by entering at least one of textual information, attaching a media file, and/or a combination thereof through a messaging module. The processor is configured to pre-store one or more second user addresses intended to be removed from the messaging thread through a listing module. The processor is configured to match the plurality of first user addresses of intended recipients with the second user addresses stored in the listing module through a matching module. The processor is configured to prevent transmission of the messaging thread to the matched second user addresses pre-stored in the listing module through a filter module.

An aspect of the present disclosure relates to a non-transitory computer-readable storage medium comprising a set of executable instructions stored thereon that, when executed by one or more processors, cause the processors to receive a plurality of first user addresses of a plurality of intended recipients through one or more address modules. The processor is configured to initiate at least one of a messaging thread by entering textual information, attaching a media file and/or a combination thereof through a messaging module. The processor is configured to pre-store one or more second user addresses intended to be removed from the messaging thread through a listing module. The processor is configured to match the plurality of first user addresses of intended recipients with the second user addresses stored in the listing module through a matching module. The processor is configured to prevent transmission of the messaging thread to the matched second user addresses pre-stored in the listing module through a filter module.

Accordingly, one advantage of the present invention is that it ensures the integrity, confidentiality, and authenticity of the data (messaging thread).

Accordingly, one advantage of the present invention is that it does not allow the intended recipients to remove the second user addresses pre-stored in the listing module of the user (person who initiated the messaging thread). However, the intended recipients may include or add additional second user addresses (different from the originally pre-stored second user addresses) in their listing module.

Accordingly, one advantage of the present invention is that the filter module may detect one or more predefined regular expressions (such as *@gmail.com, *@yahoo.com, *@outlook.com, * @ *.??? etc or expression related to the email id of any organization) of the messaging platform to prevent the transmission of the messaging thread.

Accordingly, one advantage of the present invention is that the suggestion module may suggest additional second user addresses to be stored in the listing module based on a confidentiality level quantified by content analysis module and/or by analyzing the first and/or second user addresses listed in the address module.

Accordingly, one advantage of the present invention is that the listing module may include a time-bound encryption algorithm that has a predefined time of the day or a predefined day of the year for the encryption to be able to be decrypted so that the intended recipients may transmit the messaging thread to the second user addresses stored in the listing module or any other user addresses.

Other features of embodiments of the present disclosure will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realize, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION OF THE ILLUSTRATIVE EMBODIMENTS

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Systems and methods are disclosed for controlling the unauthorized transmission of a messaging thread in a messaging platform. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

The present invention discloses a device and method, whereby an unauthorized transmission control device dynamically controls the unauthorized transmission of the messaging thread in the messaging platform. Although the present disclosure has been described with the purpose of securing data, it should be appreciated that the same has been done merely to illustrate the invention in an exemplary manner and to highlight any other purpose or function for which explained structures or configurations could be used and is covered within the scope of the present disclosure.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory or memory devices.

Figure 1:
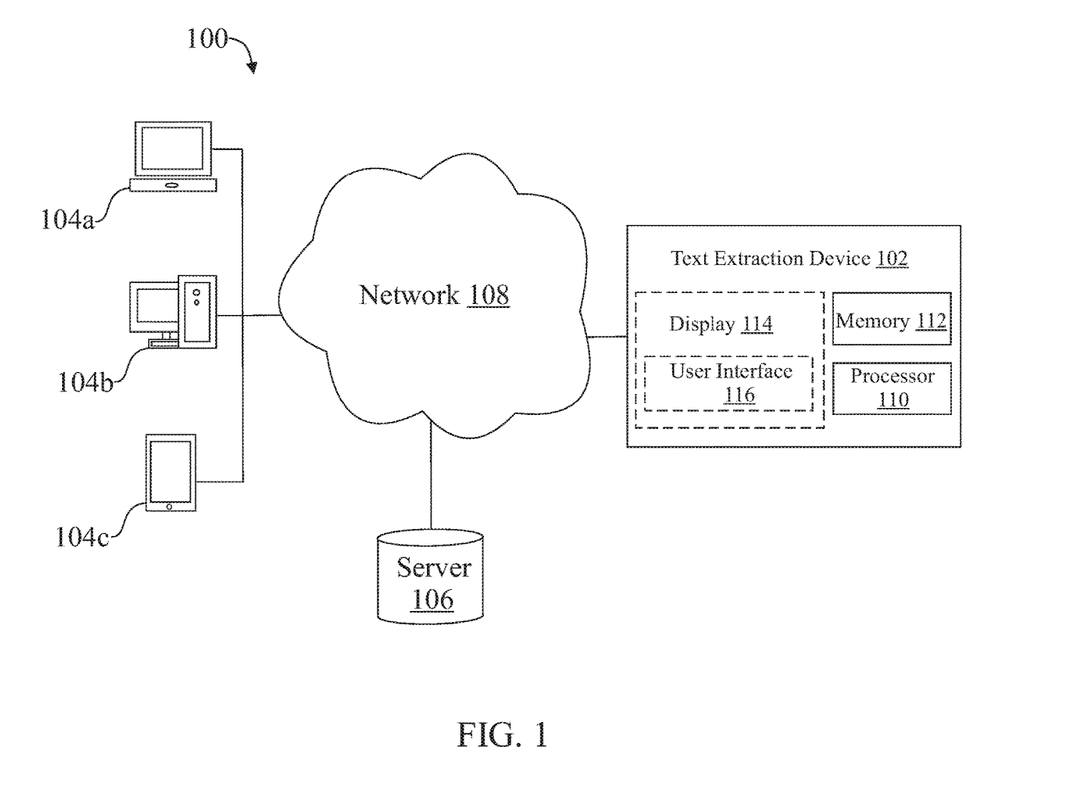
FIG. 1 illustrates a block diagram of the present system for controlling an unauthorized transmission of a messaging thread in a messaging platform, in accordance with at least one embodiment.

FIG. 1 illustrates a block diagram of the present system for controlling the unauthorized transmission of a messaging thread in a messaging platform, in accordance with at least one embodiment. System 100 includes an unauthorized transmission control device 102 that dynamically controls the unauthorized transmission of a messaging thread in a messaging platform. Messaging platforms enable internet users to exchange messages for the purpose of human interactions or communications. Messaging platforms provide personalized interactions, among colleagues, friends, customer service agents, and customers, etc. Examples of the messaging platform including but not limited to the email system, a mobile application (such as WhatsApp), social media (such as Facebook and Twitter), eCommerce websites. In particular, the unauthorized transmission control device 102 receives a plurality of first user addresses of a plurality of intended recipients through one or more address modules. The unauthorized transmission control device 102 initiates a messaging thread by entering at least one of textual information, attaching a media file and/or a combination thereof through a messaging module. The unauthorized transmission control device 102 pre-stores one or more second user addresses intended to be removed from the messaging thread through a listing module. The unauthorized transmission control device 102 matches the plurality of first user addresses of intended recipients with the second user addresses stored in the listing module through a matching module. The unauthorized transmission control device 102 prevents transmission of the messaging thread to the matched second user addresses pre-stored in the listing module through a filter module.

The unauthorized transmission control device 102 prevents the messaging thread from being transmitted to the one or more second user addresses by the plurality of intended recipients. The unauthorized transmission control device 102 analyzes the textual information, a plurality of first user addresses of a plurality of intended recipients listed in the address module, a plurality of second user addresses and the attached media file to quantify a confidentiality level based on the analysis. The unauthorized transmission control device 102 suggests the one or more second user addresses to be stored in the listing module based on the quantified confidentiality level. In an embodiment, the one or more first user addresses are different from the one or more second user addresses.

The messaging thread may be presented to the user by a plurality of computing devices 104 (for example, a laptop 104a, a desktop 104b, and a smartphone 104c). The messaging thread may be stored within a plurality of computing devices 104. Other examples of a plurality of computing devices 104, may include but are not limited to a phablet and a tablet. Alternatively, the messaging thread may be stored on a server 106 and may be accessed by a plurality of computing devices 104 via a network 108. Network 108 may be a wired or a wireless network, and the examples may include but are not limited to the Internet, Wireless Local Area Network (WLAN), Wi-Fi, Long Term Evolution (LTE), Worldwide Interoperability for Microwave Access (WiMAX), and General Packet Radio Service (GPRS). In other embodiments, the system 100 may not have all of the elements or features listed and/or may have other elements or features instead of or in addition to those listed.

When a user of laptop 104a, for example, wants to visualize the messaging thread, laptop 104a communicates the same with the unauthorized transmission control device 102, via network 108. The unauthorized transmission control device 102 then presents the messaging thread as per the user's request. To this end, the unauthorized transmission control device 102 includes a processor 110 that is communicatively coupled to a memory 112, which may be a non-volatile memory or a volatile memory. Examples of non-volatile memory may include, but are not limited to flash memory, a Read Only Memory (ROM), a Programmable ROM (PROM), Erasable PROM (EPROM), and Electrically EPROM (EEPROM) memory. Examples of volatile memory may include but are not limited Dynamic Random Access Memory (DRAM), and Static Random-Access memory (SRAM).

Processor 110 may include at least one data processor for executing program components for executing user- or system-generated requests. A user may include a person, a person using a device such as those included in this disclosure, or such a device itself. Processor 110 may include specialized processing units such as integrated system (bus) controllers, memory management control units, floating point units, graphics processing units, digital signal processing units, etc.

Processor 110 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 110 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 110 may be disposed of in communication with one or more input/output (I/O) devices via an I/O interface. I/O interface may employ communication protocols/methods such as, without limitation, audio, analog, digital, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Memory 112 further includes various modules that enable the unauthorized transmission control device 102 to dynamically control the unauthorized transmission of a messaging thread in a messaging platform as requested by the user. These modules are explained in detail in conjunction with FIG. 2. Unauthorized transmission control device 102 may further include a display 114 having a User Interface (UI) 116 that may be used by a user or an administrator to initiate a request to dynamically control the unauthorized transmission of a messaging thread in a messaging platform. Display 114 may further be used to display the messaging thread. The functionality of the data security device 102 may alternatively be configured within each of plurality of computing devices 104.

Figure 2:
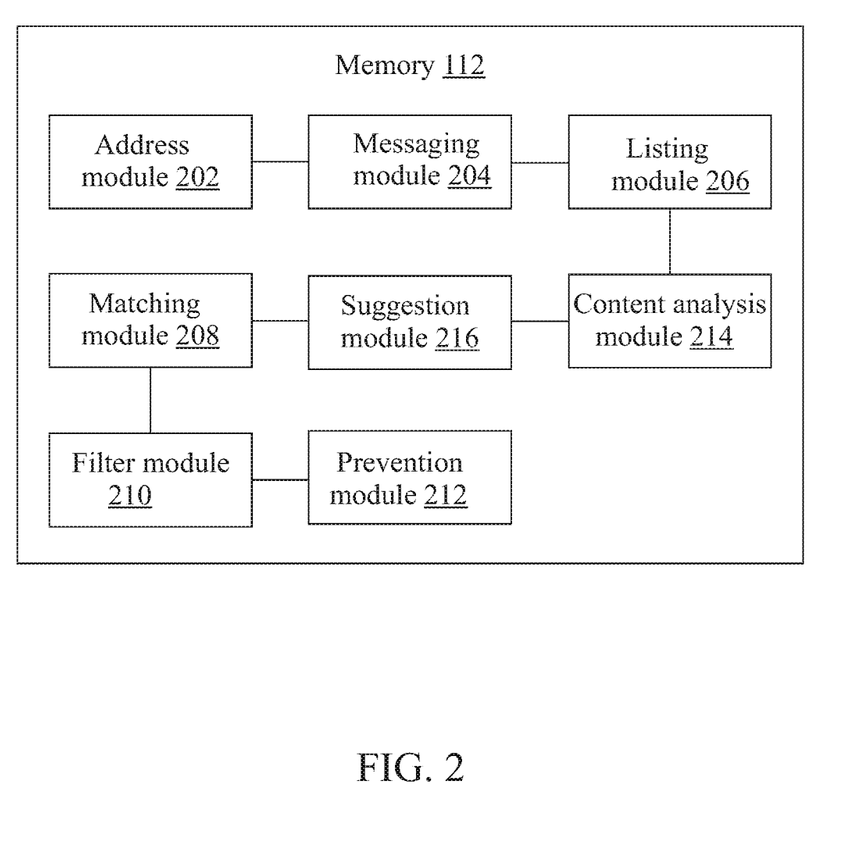
FIG. 2 illustrates a block diagram of the various modules within a memory of an unauthorized transmission control device, in accordance with at least one embodiment.

FIG. 2 illustrates a block diagram of the various modules within a memory 112 of an unauthorized transmission control device, in accordance with at least one embodiment. Memory 112 includes one or more address modules 202, a messaging module 204, a listing module 206, a matching module 208, a filter module 210, a prevention module 212, a content analysis module 214, and a suggestion module 216. In other embodiments, the memory 112 may not have all of the elements or features listed and/or may have other elements or features instead of or in addition to those listed.

One or more address modules 202 are adaptable to receive a plurality of first user addresses of a plurality of intended recipients. The present specification describes the various modules of the present system 100 in terms of email/e-mail system as a messaging platform. Examples of the one or more address modules 202 include but not limited to a "TO field", "CC field" and "BCC field". Messaging module 204 initiates a messaging thread by performing at least one of entering textual information and/or attaching the media file. Examples of the messaging module 204 may include a compose interface that allows a user to write the message and/or attach the media files including but not limited to a document, an audio file, and a video file.

Listing module 206 is adaptable to pre-store one or more second user addresses intended to be removed from the messaging thread. Example of listing module 206 in terms of the email system is a "Delete Carbon Copy" (DCC field). While sending an email, email id or several email ids present in the listing module 206 (DCC field) do not receive the particular email even if these email ids are present in the "TO field", "CC field" and "BCC field". The email ids may be present in one or more predefined expressions (such as *@gmail.com, *@yahoo.com, *@outlook.com, *@*.com, *@*.??, where *, ? etc are usual regular expressions or expression related to the email id of any organization).

In an embodiment, the listing module 206 may include a time-bound encryption algorithm that has a predefined time of the day or a predefined day of the year for the encryption to be able to be decrypted so that the intended recipients may transmit the messaging thread to the second user addresses stored in the listing module or any other user addresses. Thus the listing module 206 facilitates an initiator (originator or source) of the messaging thread to feed an expiry duration in terms of the predefined time of the day or the predefined day of the year so that the messaging thread can automatically be decrypted after the expiry duration and transmitted to the second user addresses stored in the listing module or any other user addresses.

Matching module 208 matches the plurality of first user addresses of intended recipients with the second user addresses stored in the listing module 206. Filter module 210 prevents transmission of the messaging thread to the matched second user addresses pre-stored in the listing module 206. For example, the listing module 206 or the DCC field suppresses the availability of an email and attached media files to the email ids which are present in the DCC field (whether those email ids are present or absent in the "TO field", "CC field" and "BCC field"). This suppressing continues in all the subsequent messaging threads of the same email. Further, the filter module 210 may detect one or more predefined expressions (such as *@gmail.com, *@yahoo.com, *@outlook.com, *@*.com, *@*.??, where *, ? etc are usual regular expressions or expression related to email id of any organization) of the messaging platform to prevent the transmission of the messaging thread.

Prevention module 212 prevents the messaging thread from being transmitted to the one or more second user addresses by the plurality of intended recipients. In an embodiment, the prevention module 212 prevents the intended recipients from transmitting the attached media files the one or more second user addresses. In an embodiment, the prevention module 212 also prevents the intended recipients from transmitting the attached media files to the second user addresses after downloading the attached media files to their computing devices 104. The prevention module 212 may analyze the metadata of the attached media file to identify creators of the attached media file and the time the attached media was composed or edited to prevent the attached media files from being transmitted to the second user addresses by the intended recipients. Metadata of the media file contains information about second user addresses among other pieces of information.

Content analysis module 214 is integrated with the messaging module 204 to analyze the textual information, a plurality of first user addresses of a plurality of intended recipients listed in the address module, a plurality of second user addresses and the attached media file to quantify a confidentiality level based on the analysis. In an embodiment, the content analysis module 214 may train a machine learning model on the textual information and/or the attached media file of the messaging thread (e.g. email) and/or a plurality of first user addresses of a plurality of intended recipients listed in the address module and/or a plurality of second user addresses to flag the confidentiality level of the messaging thread (email).

Suggestion module 216 is integrated with the content analysis module 214 to suggest one or more second user addresses to be stored in the listing module 206 based on the quantified confidentiality level. As per the confidentiality level, the options that can go into the listing module 206 (DCC field) may be suggested. Additionally, the suggestion module 216 may analyze a historical data (previous messaging threads) of "TO field", "CC field", "BCC and DCC field to suggest one or more second user addresses to be stored in the listing module 206 (DCC field). In an embodiment, the one or more first user addresses are different from the one or more second user addresses.

Figure 3:
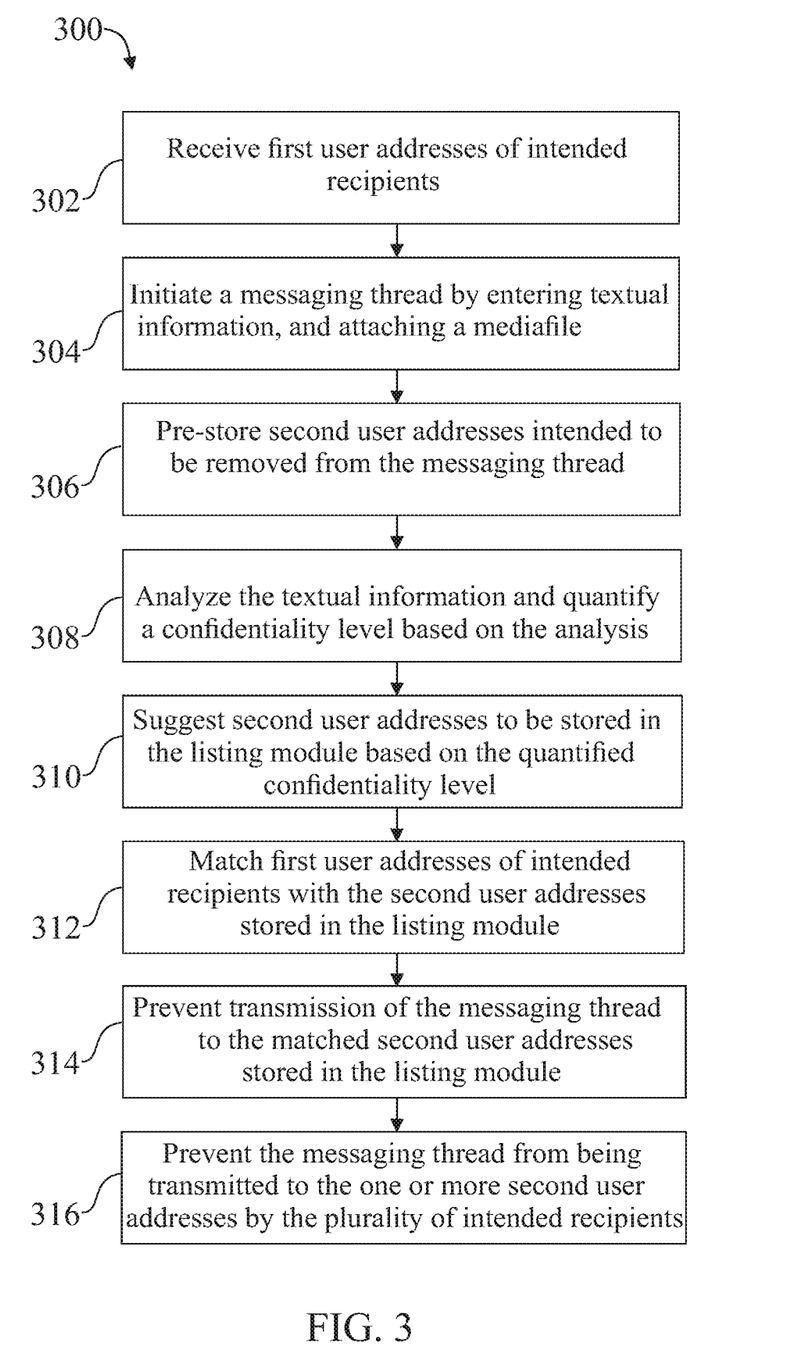
FIG. 3 illustrates a flowchart of the method for controlling the unauthorized transmission of a messaging thread in a messaging platform, in accordance with at least one embodiment.

FIG. 3 illustrates a flowchart 300 of the method for controlling the unauthorized transmission of a messaging thread in a messaging platform, in accordance with at least one embodiment. The method includes the step 302 of receiving a plurality of first user addresses of a plurality of intended recipients through one or more address modules. The method then includes the step 304 of initiating a messaging thread by performing at least one of entering textual information, attaching a media file, and/or a combination thereof through a messaging module. Further, the method includes the step 306 of pre-storing one or more second user addresses intended to be removed from the messaging thread through a listing module. The method includes the step 308 of analyzing the textual information, a plurality of first user addresses of a plurality of intended recipients listed in the address module, a plurality of second user addresses and the attached media file to quantify a confidentiality level based on the analysis. The method includes step 310 of suggesting the one or more second user addresses to be stored in the listing module based on the quantified confidentiality level through a suggestion module.

In an embodiment, the one or more first user addresses are different from the one or more second user addresses.

The method then includes the step 312 of matching the plurality of first user addresses of intended recipients with the second user addresses stored in the listing module through a matching module. The method includes step 314 of preventing transmission of the messaging thread to the matched second user addresses pre-stored in the listing module through a filter module. The method includes the step 316 of preventing the messaging thread from being transmitted to the one or more second user addresses by the plurality of intended recipients through a prevention module.

Figure 4:
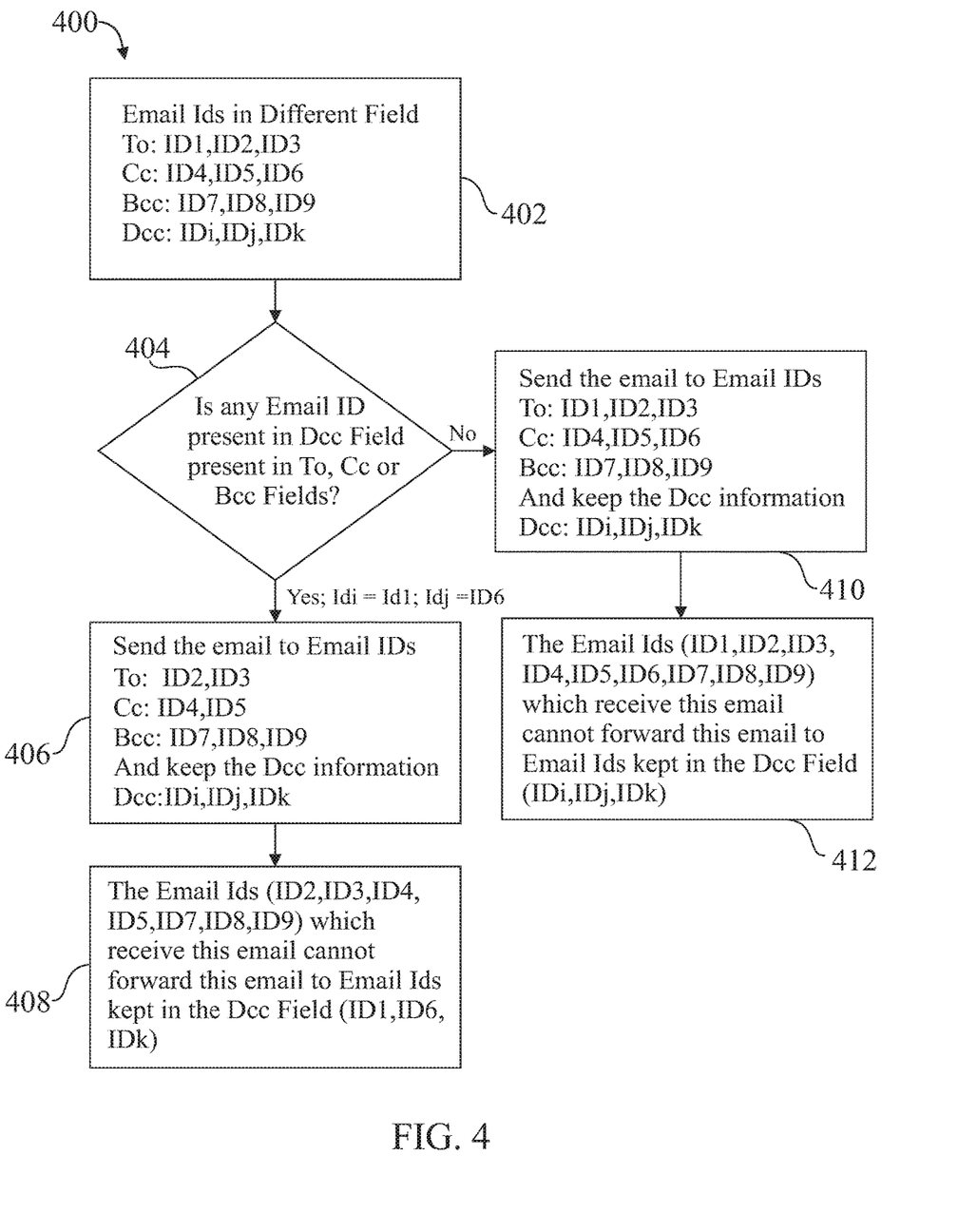
FIG. 4 illustrates a first flowchart of the method for controlling the unauthorized transmission of a messaging thread in an electronic mail (email or e-mail) system, in accordance with at least one embodiment.

FIG. 4 illustrates a first flowchart 400 of the method for controlling the unauthorized transmission of a messaging thread in an electronic mail (email or e-mail) system, in accordance with at least one embodiment. In step 402, various email ids are entered in the "TO field", the "CC field", the "BCC field", and the listing module 206 (DCC field). In step 404, the method determines if any email ids present in the listing module 206 (DCC field) present in the "TO field", the "CC field", the "BCC field". In step 410, the method transmits the messaging thread to the email ids present in the "TO field", the "CC field", the "BCC field" on determining that the email ids present in the listing module 206 (DCC field) are not present in the "TO field", the "CC field", the "BCC field". In step 412, the method prevents the messaging thread from being transmitted to the email ids present in the listing module 206 (DCC field) by the intended recipients. In case, any email ids present in the listing module 206 (DCC field) are also present in the "TO field", "CC field", "BCC field", at step 406, the method only transmits the messaging thread to the email ids present in the "TO field", the "CC field", the "BCC field" and does not transmit the messaging thread to the email ids present in the listing module 206 (DCC field). In step 408, the method prevents the messaging thread from being transmitted to the email ids present in the listing module 206 (DCC field) by the intended recipients.

Figure 5:
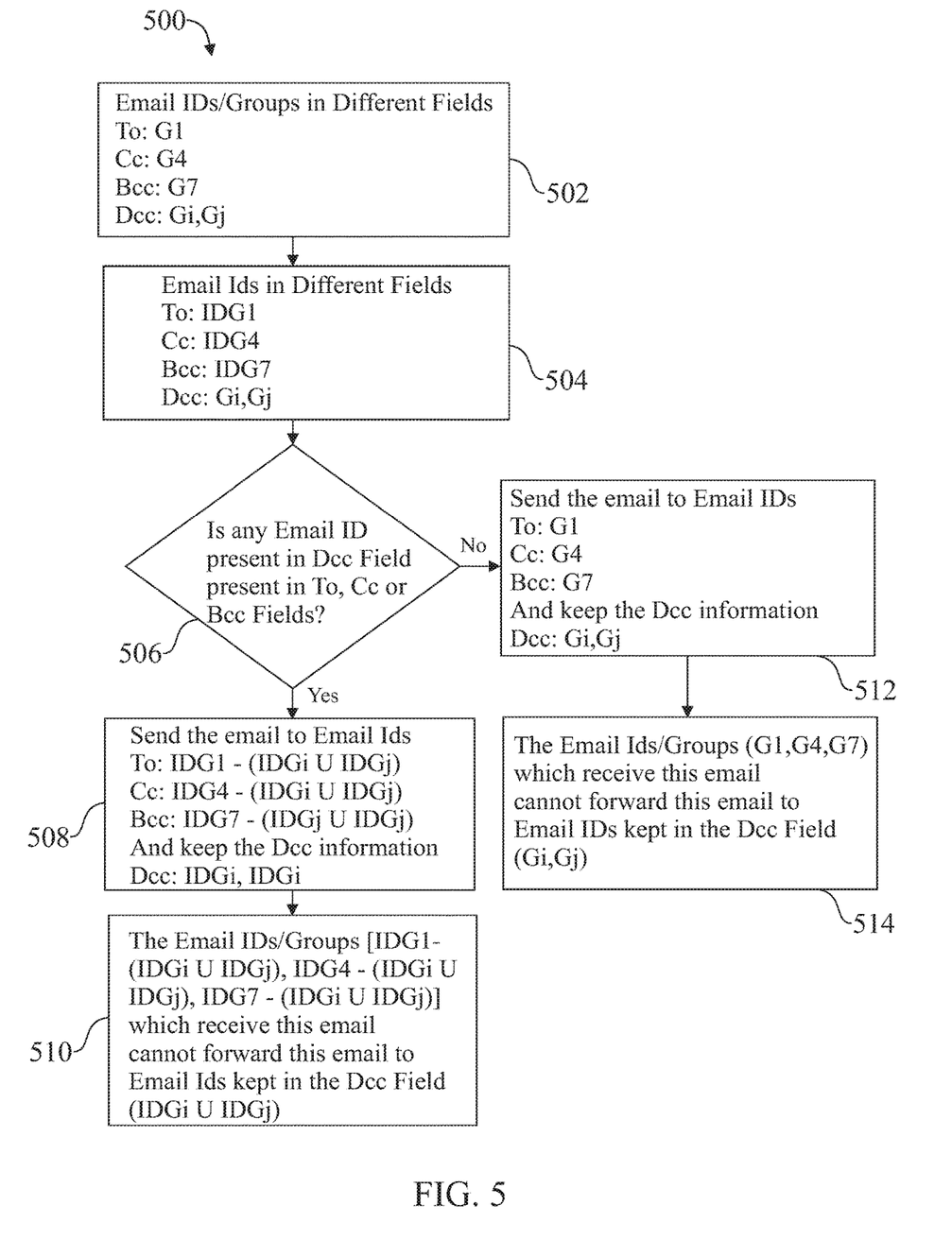
FIG. 5 illustrates a second flowchart of the method for controlling the unauthorized transmission of a messaging thread in an electronic mail (email or e-mail) system, in accordance with at least one embodiment.

FIG. 5 illustrates a second flowchart 500 of the method for controlling the unauthorized transmission of a messaging thread in an electronic mail (email or e-mail) system, in accordance with at least one embodiment. FIG. 5 is explained in conjunction with FIG. 4. Email groups (which may contain other email groups and/or individual email ids) are created for efficiency purpose. In step 502, various email groups are entered in the "TO field", the "CC field", the "BCC field", and the listing module 206 (DCC field). In step 504, various email ids corresponding to the email groups are entered in the "TO field", the "CC field", the "BCC field", and the listing module 206 (DCC field).

In step 506, the method determines if any email ids present in the listing module 206 (DCC field) present in the "TO field", the "CC field", the "BCC field". In step 512, the method transmits the messaging thread to the email ids present in the "TO field", the "CC field", the "BCC field" on determining that the email ids present in the listing module 206 (DCC field) are not present in the "TO field", the "CC field", the "BCC field". In step 514, the method prevents the messaging thread from being transmitted to the email ids or email groups present in the listing module 206 (DCC field) by the intended recipients. In case, any email ids present in the listing module 206 (DCC field) are also present in the "TO field", "CC field", "BCC field", at step 508, the method only transmits the messaging thread to these email ids present in the "TO field", the "CC field", the "BCC field" that are not present in the listing module 206 (DCC field). In step 408, the method prevents the messaging thread from being transmitted to the email ids or email groups present in the listing module 206 (DCC field) by the intended recipients.

In an exemplary operation of the present invention, a person wants to send an email to most of the email ids present in an email group but doesn't want to send that email to some of the email ids. Those email ids can be put in the DCC field, and the email is not sent to the email ids present in the DCC field. This suppressing continues in all the subsequent threads of the same email. Any documents which are attached with an email follow the same principle of DCC filed. The information about the DCC gets embedded (in terms of metadata) into the document and the document under no circumstances can be passed on to the email ids present in the DCC field. Additionally, the information about which email ids need to be present in the DCC field can also be derived automatically from the content of the email or from email ids present in the "TO field", the "CC field", the "BCC field" or the "DCC field". A machine learning model can be trained on the content of an email to flag the confidentiality level of the email. As per the confidentiality level, the options that can go into the DCC fields can be suggested.

The information about which email ids need to be present in the DCC field may also be derived automatically from the previous emails (for example, if whenever an email is sent to certain email ids (X), certain email ids are put in DCC field (Y), then whenever a new email is written to those email ids (X), suggestions are made about email ids which can be put in DCC filed (Y)). This can be learned from historical email group patterns occurring in the "TO field", "CC field", "BCC field" and "DCC field". A machine learning model can be trained to learn these group patterns from previous emails and used to suggest options that can go into the DCC fields once "TO field", "CC field", "BCC field", "DCC field" get populated.

There could be reasons when an email should not be sent to a particular email id (or a group of email ids) under any circumstances—the reason for this could be personal or professional or both. The new DCC field in the email system can ensure this. If the email id is (or several email ids are) mentioned in the DCC field of an email, the sending of that email is to surpassed to the email id(s) mentioned in the DCC field.

For efficiency purpose, typically the email groups are created. These email groups contain several email ids, and an email sent to an email group reaches all the email ids present in the group. On occasion, a person needs to send an email to most of the email ids present in the group but avoid a few email ids. The current process is manual and tedious. A new field is envisage called as Delete Carbon Copy (DCC)—it is beyond regular "TO field", "CC field", and "BCC field". Any email id present in the DCC field is matched with the email ids present in email groups written in the "TO field", "CC field", "BCC field", and email is not sent (suppressed) to the matched email ids.

The email ids or email groups can be manually entered in the DCC field and/or derived from the content of the email using machine learning and artificial intelligence tools. Machine learning tools include, but are not limited to, categorisation models (for example, logistic regression, SVM, ANNs etc.), NLP/NLU models etc. which can be understand the mail and suggest the email ids or group email ids which can be put into the DCC field for that particular mail. Every organization may have its own set of DCC groups/email ids for a different level of confidentiality. For a mail with certain confidentiality, these groups/email ids can be suggested for the DCC field to the user while sending the mail.

Thus the present system, device, and method ensure the integrity, confidentiality, and authenticity of the data (messaging thread). The listing module (DCC field) disclosed in the present invention may be utilized for any messaging platform.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

We claim:

1. A method for controlling unauthorized transmission of a messaging thread in a messaging platform, the method comprising steps of:
   receiving, by an unauthorized transmission control device, a plurality of first user addresses of a plurality of intended recipients through one or more address modules;
   initiating, by the unauthorized transmission control device, a messaging thread by performing at least one of entering textual information, attaching a media file and/or a combination thereof through a messaging module;
   pre-storing, by the unauthorized transmission control device, one or more second user addresses intended to be removed from the messaging thread through a listing module;
   matching, by the unauthorized transmission control device, the plurality of first user addresses of intended recipients with the second user addresses stored in the listing module through a matching module; and
   preventing, by the unauthorized transmission control device, transmission of the messaging thread to the matched second user addresses pre-stored in the listing module through a filter module.

2. The method according to claim 1 comprises the step of preventing, by the unauthorized transmission control device, the messaging thread from being transmitted to the one or more second user addresses by the plurality of intended recipients through a prevention module.

3. The method according to claim 1 comprises the step of analyzing, by the unauthorized transmission control device, the textual information, the plurality of first user addresses of the plurality of intended recipients listed in the address module, the plurality of second user addresses and the attached media file to quantify a confidentiality level based on the analysis.

4. The method according to claim 1 comprises the step of suggesting, by the unauthorized transmission control device, the one or more second user addresses to be stored in the listing module based on the quantified confidentiality level through a suggestion module, wherein the one or more first user addresses are different from the one or more second user addresses.

5. An unauthorized transmission control device to dynamically control unauthorized transmission of a messaging thread in a messaging platform, comprising:
   a processor; and
   a memory communicatively coupled to the processor, wherein the memory stores instructions, which, on execution by the processor, causes the processor to:
   receive a plurality of first user addresses of a plurality of intended recipients through one or more address modules;
   initiate a messaging thread by performing at least one of entering textual information, and/or attaching a media file through a messaging module;
   pre-store one or more second user addresses intended to be removed from the messaging thread through a listing module;
   match the plurality of first user addresses of intended recipients with the second user addresses stored in the listing module through a matching module; and
   prevent transmission of the messaging thread to the matched second user addresses pre-stored in the listing module through a filter module.

6. The unauthorized transmission control device according to claim 5 comprises a prevention module to prevent the messaging thread from being transmitted to the one or more second user addresses by the plurality of intended recipients.

7. The unauthorized transmission control device according to claim 5 comprises a content analysis module integrated with the messaging module to analyze the textual information, the plurality of first user addresses of the plurality of intended recipients, and the attached media file to quantify a confidentiality level based on the analysis.

8. The unauthorized transmission control device according to claim 5 comprises a suggestion module integrated with the content analysis module to suggest the one or more second user addresses to be stored in the listing module based on the quantified confidentiality level, wherein the one or more first user addresses are different from the one or more second user addresses.

9. A non-transitory computer-readable storage medium comprising a set of executable instructions stored thereon that, when executed by one or more processors, cause the processors to:
   receive a plurality of first user addresses of a plurality of intended recipients through one or more address modules;
   initiate a messaging thread by performing at least one of entering textual information, and/or attaching a media file through a messaging module;
   pre-store one or more second user addresses intended to be removed from the messaging thread through a listing module;
   match the plurality of first user addresses of intended recipients with the second user addresses stored in the listing module through a matching module; and
   prevent transmission of the messaging thread to the matched second user addresses pre-stored in the listing module through a filter module.

10. The non-transitory computer-readable storage medium according to claim 9, wherein the processors is configured to:
    prevent the messaging thread from being transmitted to the one or more second user addresses by the plurality of intended recipients through a prevention module;
    analyze the textual information, the plurality of first user addresses of the plurality of intended recipients listed in the address module, the plurality of second user addresses and the attached media file to quantify a confidentiality level based on the analysis; and
    suggest the one or more second user addresses to be stored in the listing module based on the quantified confidentiality level through a suggestion module, wherein the one or more first user addresses are different from the one or more second user addresses.

\* \* \* \* \*